United States Patent
Andretta

(10) Patent No.: US 9,468,333 B2
(45) Date of Patent: Oct. 18, 2016

(54) CONTAINER FOR RAPID HOT-FOOD CATERING AND ASSOCIATED HEATING STATION

(71) Applicant: Heatis AG, Schlieren (CH)

(72) Inventor: Carlo Andretta, Uitikon-Waldegg (CH)

(73) Assignee: Heatis AG (CH)

(*) Notice: Subject to any disclaimer, the term of this patent is extended or adjusted under 35 U.S.C. 154(b) by 0 days.

(21) Appl. No.: 14/407,293

(22) PCT Filed: May 30, 2013

(86) PCT No.: PCT/EP2013/061216
§ 371 (c)(1),
(2) Date: Apr. 13, 2015

(87) PCT Pub. No.: WO2013/186060
PCT Pub. Date: Dec. 19, 2013

(65) Prior Publication Data
US 2015/0342398 A1    Dec. 3, 2015

(30) Foreign Application Priority Data
Jun. 12, 2012  (EP) .................................... 12171695

(51) Int. Cl.
*A47J 36/24*    (2006.01)
*A47J 36/02*    (2006.01)
*F24J 3/00*    (2006.01)

(52) U.S. Cl.
CPC ........... *A47J 36/022* (2013.01); *A47J 36/2433* (2013.01); *A47J 36/2483* (2013.01); *F24J 3/00* (2013.01)

(58) Field of Classification Search
USPC ................................ 219/429, 432, 433, 436
See application file for complete search history.

(56) References Cited

U.S. PATENT DOCUMENTS

| | | | | |
|---|---|---|---|---|
| 2,194,820 A * | 3/1940 | Connell et al. | ............... | 219/433 |
| 2,470,806 A * | 5/1949 | Del Cueto | .................... | 219/433 |
| 2,700,097 A * | 1/1955 | Morey | .......................... | 219/433 |
| 3,296,415 A | 1/1967 | Eisler | | |
| 3,808,825 A * | 5/1974 | Ciurea | ............................. | 62/3.3 |
| 3,896,973 A * | 7/1975 | Morgan | .................... | 222/146.5 |
| 3,983,361 A * | 9/1976 | Wild et al. | ..................... | 219/433 |
| 4,700,050 A * | 10/1987 | Hennuy et al. | ............... | 219/438 |
| 4,996,410 A * | 2/1991 | Ho | ................. | 219/432 |
| 6,639,186 B1 * | 10/2003 | Perez | ........................... | 219/387 |
| 6,703,590 B1 | 3/2004 | Holley, Jr. | | |
| 7,166,822 B1 * | 1/2007 | Chang et al. | ................. | 219/521 |
| 2005/0103739 A1 | 5/2005 | Brown | | |
| 2010/0089901 A1 | 4/2010 | Montana | | |

FOREIGN PATENT DOCUMENTS

FR    2 828 082    2/2003
FR    2 922 744    5/2009

* cited by examiner

*Primary Examiner* — Joseph M Pelham
(74) *Attorney, Agent, or Firm* — George Pappas

(57) ABSTRACT

A container for rapid hot-food catering comprising a base part (2) and a cover part (4) disposed thereon, wherein the said parts together form a medium-tight chamber (6) for a meal portion to be heated. The base part comprises a primary heat transfer element (8) protruding into the chamber and comprising a metal sleeve (10) which extends into the base part and is provided with an upper closure cap, which metal sleeve is connected to the base part in a medium-tight manner. An associated heating station has a rod-like heating element which can be moved out of a contact surface for the container.

15 Claims, 8 Drawing Sheets

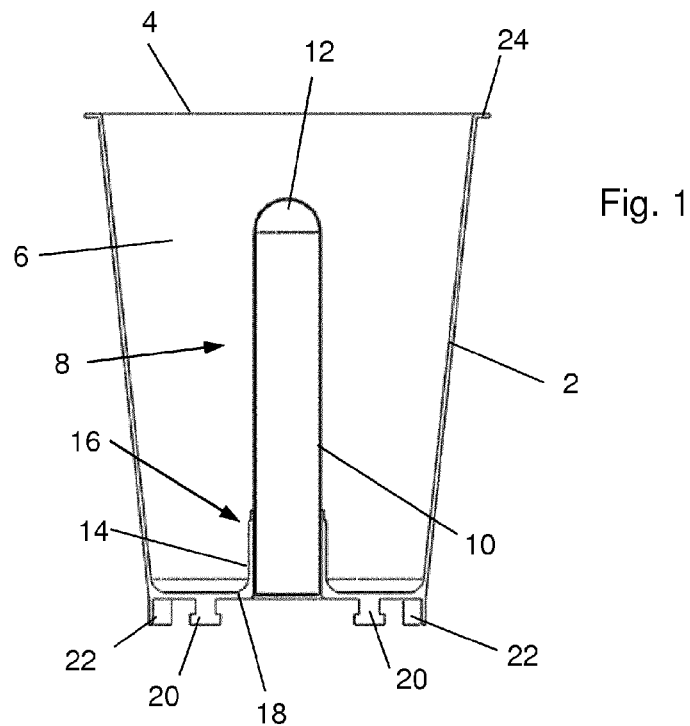
Fig. 1
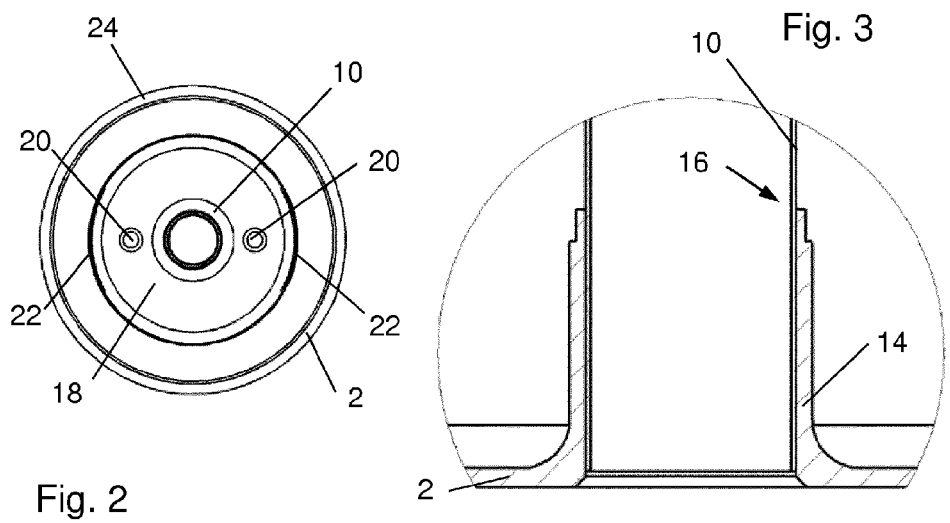
Fig. 2
Fig. 3

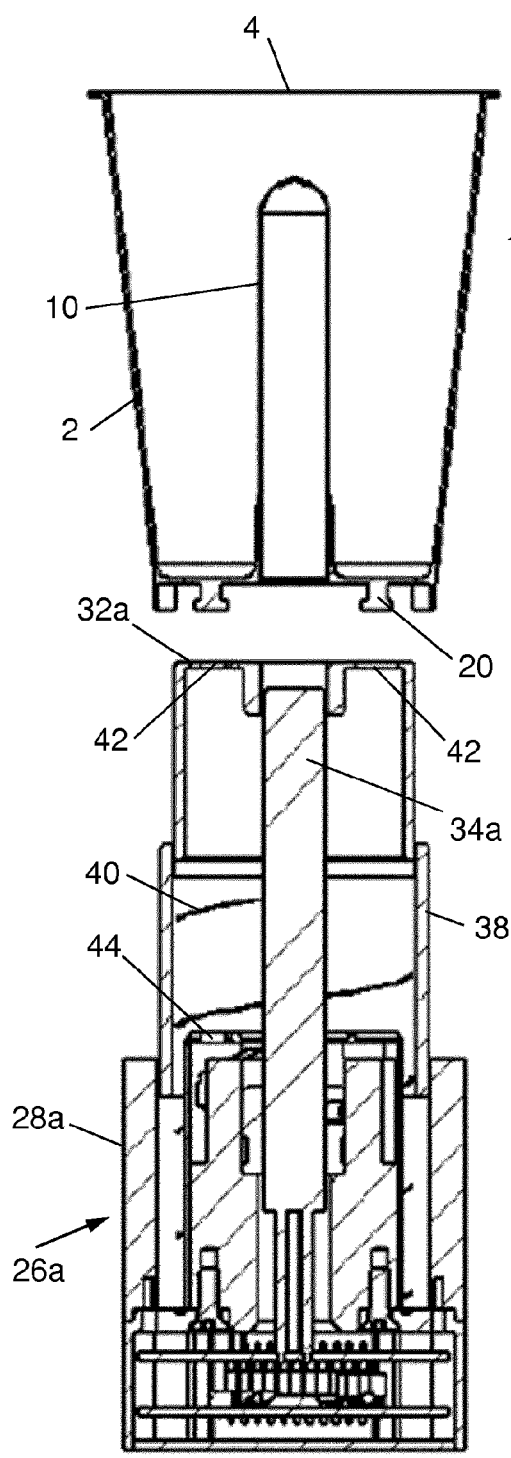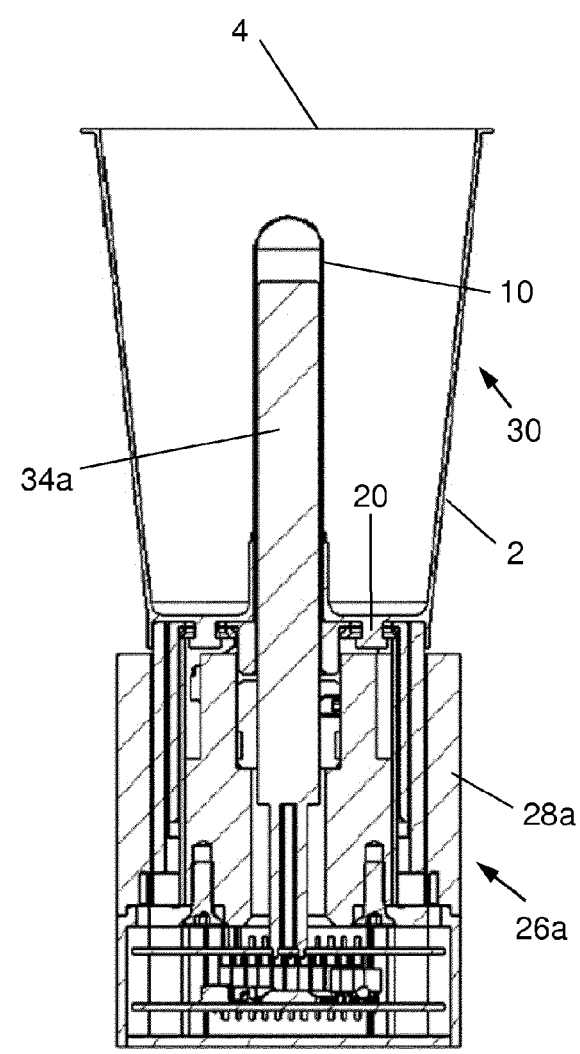
Fig. 6
Fig. 7

CONTAINER FOR RAPID HOT-FOOD CATERING AND ASSOCIATED HEATING STATION

This application claims priority from PCI application No. PCT/EP2013/061216 filed May 30, 2013 which claims priory from European application No. EP 12171695.5 filed on Jun. 12, 2012, the disclosures of which are incorporated herein by reference.

TECHNICAL FIELD

The invention relates to a container for rapid hot-food catering and to an associated heating station.

PRIOR ART

It meets the needs of today's working and lifestyle to provide a high-quality hot-food catering preferably anywhere and at any time. In the present context the term "meal" is to be understood as including foodstuffs and also beverages. Accordingly, the term "hot-food catering" comprises a variety of hot drinks such as coffee, tea and milk drinks, but also warm liquid meals such as, particularly, soups and also warm solid meals such as rice, pasta, hamburgers and the like. The attribute "rapid" is to be understood in the present context in such manner that the preparation of a meal portion, including the warming-up, will take at most a few minutes.

There already exist various containers for rapid hot-food catering, which are also at least partially described in the patent literature.

For example, in U.S. Pat. No. 3,296,415, there is described a device for heating edibles in small disposable containers, for which purpose a foil-like electric heating element is provided in the wall of the respective container.

Moreover, U.S. Pat. No. 6,703,590 describes a device for electrical heating of baby food in a container. The heating takes place by means of a cylindrical heating element which surrounds the container, for which purpose a good mechanical contact between the container wall and the heating cylinder is required. A similar heating principle for paper cups is described in patent application US 2010/0089901.

However, the previous solutions each require a rather complicated configuration of the heating device and/or of the container and, therefore, they are not suitable for a broad commercial use because of practicability and cost reasons.

SUMMARY OF THE INVENTION

Therefore, it is an object of the invention to provide an improved container for rapid hot-food catering. In particular, the container shall be characterized by a relatively simple construction and shall be suitable for a variety of different contents. In particular, the container of the present invention shall be useable for beverages to be heated and also for all kinds of meal portions to be heated. A further object of the invention is to provide a heating station for heating the container of the present invention.

These objects are achieved by the container and by the heating station as described.

The container of the present invention for rapid hot-food catering comprises a base part and a cover part disposed thereon, wherein the said parts together form a medium-tight chamber for a meal portion to be heated. At least the base part is made of a thermoplastic resin. The base part comprises a primary heat transfer element protruding into the chamber and comprising a metal sleeve which extends into the base part and which is provided with an upper closure cap, the metal sleeve being connected to the base part in a medium-tight manner.

The measures of the invention result in a container that stands out, among other features, by a simple and inexpensive construction, excellent heat transfer characteristics, ease of handling and also a broad applicability.

In principle, the container of the present invention can be intended for repeated use. However, for many fields of application it will be desirable to dispose the container after a single use. This is made possible in an economically and environmentally responsible manner due to the possibility of inexpensive production and the use of environment-friendly materials.

Therefore, the container of the present invention allows for provision of heatable meal portions which are well suited for storage and are appealing, and which can be assembled for the most diverse customers. These comprise each an appropriately configured container according to the present invention and also a liquid or solid meal portion located in the container chamber. The base part is made of a food compatible thermoplastic, for example of polypropylene, and is preferably produced by injection molding.

In an embodiment that is especially suitable for liquid contents, the base part is formed in a cup-like shape, preferably in a form of an upwards slightly divergent truncated cone, at the base face of which is arranged the metal sleeve acting as primary heat transfer element. In this embodiment the cover part, which is preferably a tearable closure foil, for example an aluminum or thermoplastic foil, is attached to the upper edge of the cup-shaped base part.

Advantageous embodiments of the invention are henceforth described and are defined.

In the present context the term "metal sleeve" shall be understood as a metal-walled, in the broadest sense tube-like recess, which, however, shall not be limited either to cylindrical forms or to parallel-walled forms. In principle, it could be, for example, a conically shaped recess wherein then the tip region of the cone acts as a closure cap. However, according to a preferred embodiment, the metal sleeve is cylinder-shaped and has a planar or convex closure cap.

It is particularly advantageous if the primary heat transfer element is integrally formed from aluminum. Aluminum is characterized by an excellent thermal conductivity and is also reliable for food applications. However, in principle, also another food compatible metal can be used.

In an embodiment that is particularly suitable for the preparation of liquid meal portions the cover part contains at least one medium-tightly closed compartment for the separate storage of a component of the hot meal, wherein a segment of the compartment facing the chamber can be removed from the outside in order to bring the stored component into the chamber. Advantageously, there are one to three compartments, for example a single compartment for liquid concentrate, two compartments for soup powder and croutons, respectively, or three compartments for coffee powder, milk powder and sweetener. In this embodiment the chamber of the container will usually be filled with water by the manufacturer already, i.e. during the loading of the container. When preparing the meal portion, it is preferable to first heat the water, whereafter the separation regions of the single compartment or of the desired compartments are removed and then the contents are added to the hot water and mixed therewith. Thereby it is advantageous if the heating process is carried out with pure water thereby avoiding an undesirable local overheating of meal components in contact with the primary heat transfer element is avoided.

In an embodiment that is particularly suitable for the preparation of solid meal portions the container further comprises a secondary heat transfer element extending substantially parallel to the metal sleeve and spaced apart therefrom, which secondary heat transfer element is thermally connected with the metal sleeve at least in a region near the base by means of a tertiary heat transfer element. This results in an increased heat transfer from the heating device to the container contents. Advantageously, the secondary heat transfer element comprises two heat conducting plates that are arranged substantially parallel to each other. In particular, these can be two aluminum plates. Moreover, it is preferred if the tertiary heat transfer element is also formed from a metal sheet for which again aluminum is very advantageous.

In a further embodiment the said heat conducting plates divide the chamber of the container into three sub-chambers that are medium-tightly separated from each other. This is intended particularly for receiving certain meal portions that are formed of three different layers. Examples for such meal portions are hamburgers, sandwiches and sandwich-type products as they are known under the terms "toast", "focaccia ripiena", "piadina" and the like. In this context it is appropriate if edge zones of the heat conducting plates are received in corresponding grooves of the base and cover part. In this manner the required medium tightness and mechanical stabilization of the filled container are achieved simultaneously. It is appropriate if the grooves are filled with a sealing wax.

In an advantageous development the container comprises a scraper part arranged between the base part and the cover part, which scraper part is provided with a through hole for the metal sleeve and with through slots for the heat conducting plates. This allows to substantially avoiding a highly undesirable sticking of food residue on the heat conducting plates. In this regard, it is particularly preferred if there is a first plug-in connection having a first releasing force F1 between the heat conducting plates and the base part, the first releasing force F1 being larger than a second releasing force F2 prevailing between the heat conducting plates and the cover part. This ensures that upon separating the cover part and the base part, the heat conducting plates are disengaged from the cover part and remain attached to the base part. Moreover, it is particularly advantageous if the heat conducting plates are provided with protrusions that form a stop against the side of the scraper part facing the cover part, and if there is a further plug-in connection with a third releasing force F3 between the scraper part and the cover part, the third releasing force being smaller than the first releasing force F1. As a result thereof, upon separating the base part and cover part, the heat conducting plates remain connected with the base part and may release the scraper part from the cover part due to the said protrusions, i.e. the scraper part is taken along with the heat conducting plates of the base part.

It is highly undesirable that the heating station, which is provided for heating the container, is operated in an uncontrolled manner. Equally undesirable is an accidental separation or falling off of the container from the heating station during a heating process. Therefore, it is particularly advantageous if the heating power is only supplied when an associated container is present and correctly positioned. To ensure such a safe and appropriate handling it is, therefore, advantageous, if the base part is provided at an outer side thereof with:

i) at least one identification means for a corresponding releasing means of an associated heating station; and/or
ii) at least one attaching means for attaching to a corresponding coupling means of an associated heating station.

The identification and releasing means provided therefor can be realized, for example, by means of electronic elements, that is, for example, by means of an electric resistor arranged at the base part, the value of which is scanned by means of a measuring unit at the heating station. In a preferred mechanical embodiment the at least one identification means and/or the at least one attaching means are formed as a locking projection for insertion into a correspondingly formed locking recess acting as a releasing means and/or as coupling means, or vice versa. For example, locking projection may be provided as a T-shaped pin that cooperates with a receiving slot; the latter advantageously comprising an expanded entering portion that leads into a narrower fixing portion.

According to a further aspect, there is provided a heating station for a container of the present invention. The heating station comprises a base part and a supporting face configured for supporting the base part of the container, and a rod-like heating element extendable from the supporting face. The external dimensions of the heating element correspond to the internal dimensions of the metal sleeve of the container. The heating station of the present invention further comprises heating controlling means for effecting a controlled heating of the metal sleeve in an extended state of the heating element. Advantageously, the heating controlling means are programmed in such manner that the time period and if necessary the heating power are optimized according to the meal portion to be heated.

In principle, the heating station may be configured with a supporting face that is not movable. i.e. that is rigidly arranged against the base part. In such a case the rod-like heating element in the operating position thereof is moved slidingly upward from below out of the supporting face. This results in a relatively simple construction but has the disadvantage of a relatively tall device. Alternatively, and in many respect more advantageous, is, therefore, a variant in which the rod-like heating element is rigidly arranged against the base part and wherein the supporting face is bidirectionally slidable in an axial direction of the heating station from an upper position to a lower position. The upper position of the supporting face defines the retracted state of the heating element, while the lower position of the supporting face defines the extended state of the heating element. In this embodiment, there are also provided spring means in order to bias the supporting face into the upper position, wherein the latter corresponds to the basic position of the device without attached container. Moreover, retaining means are provided in order to retain the supporting face when necessary, i.e. when a container is resting thereon, in the lower position with extended rod-like heating element.

A relatively compact construction can be realized if the supporting face is arranged on a telescope-like sleeve.

According to a particularly preferred embodiment of the heating station, the heating controlling means cooperate with one of the above mentioned releasing means which exclusively unlocks a heating process only when an associated identification means of a container is present.

BRIEF DESCRIPTION OF THE DRAWINGS

Examples of the invention will henceforth be described in more detail by reference to the drawings, which show:

FIG. 1 a first embodiment of a container, particularly for beverages, in a longitudinal section;

FIG. 2 the beverage container of FIG. 1, in a view from below;

FIG. 3 a section of the beverage container of FIG. 1 in an enlarged view for showing the primary heat transfer element;

FIG. 6 the beverage container of FIG. 1, resting on a further embodiment of a heating station, with retracted heating element, in a longitudinal section;

FIG. 7 the beverage container and the heating station of FIG. 6, with extended heating element, again in a longitudinal section;

DETAILED DESCRIPTION OF THE PREFERRED EMBODIMENTS

Figure 4:
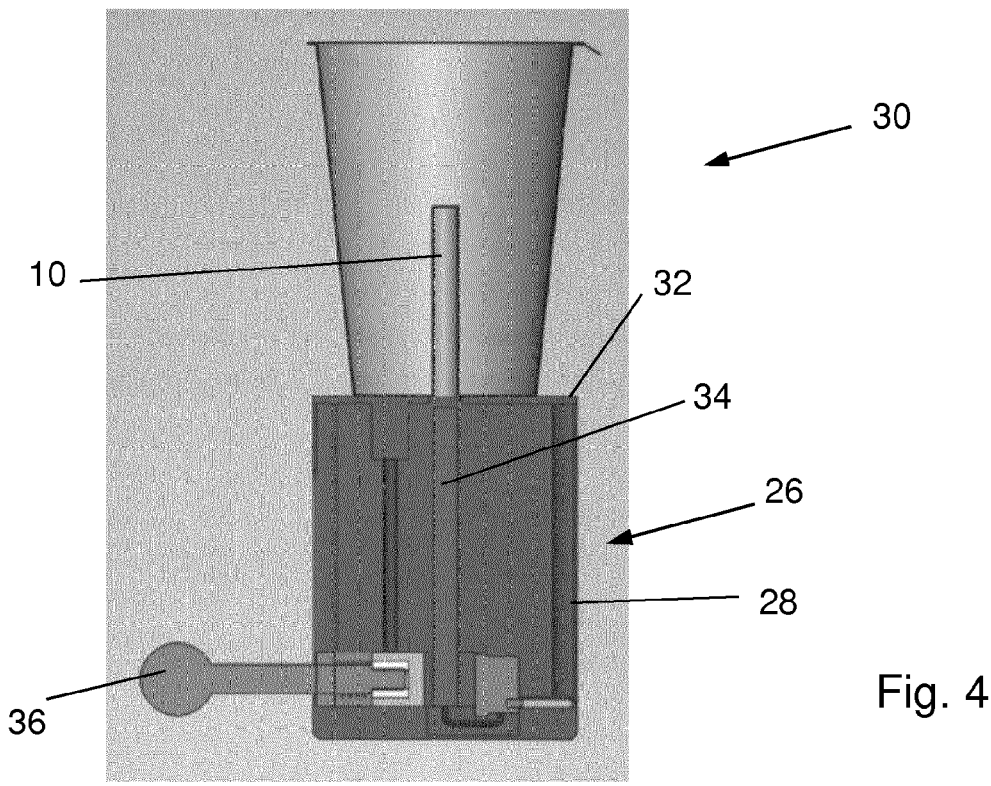
FIG. 4 the beverage container of FIG. 1 resting on a first embodiment of a heating station, with retracted heating element, in a longitudinal section.

In the following, functionally equivalent components in the various figures and exemplary embodiments are denoted with the same reference numerals.

The container for rapid hot-food catering shown in FIGS. 1 to 3 comprises a base part 2 and a cover part 4 disposed thereon, wherein the said parts together form a medium-tight chamber 6 for a meal portion to be heated. The base part is made of a thermoplastic resin, for example of polypropylene, and comprises a primary heat transfer element 8 protruding into the chamber. The primary heat transfer element 8 comprises a metal sleeve 10 which is plugged into the base part and is connected to the base part in a medium-tight manner and which is provided with an upper closure cap 12. As particularly shown in FIG. 3, the metal sleeve 10 is surrounded in the lower region thereof by a portion 14 of the base part 2 protruding into the chamber, whereby a surrounding medium-tight closure 16 is formed between these parts. In the example shown, the upper closure cap 12 and the metal sleeve 10 are integrally formed from aluminum.

Due to the fact, that the container is intended for mounting onto an associated heating station, the base part 2 is appropriately provided with a substantially parallel base face 18. This base face is provided in the example presented here with two T-shaped pins 20 projecting downward. These locking projections are provided for cooperating with corresponding locking recesses of an associated heating station and may be used as identification means and/or as attaching means. Furthermore, the base face in the example shown is provided with two circular-segment-shaped wall portions 22 projecting downward which are provided for insertion into associated guiding slots of a heating station and thereby serve as further mechanical stabilization.

The cover par 4 is formed by a thin closure foil. This is preferably formed from an aluminum foil which is provided with a thermoplastic layer at the side facing the cover part. Advantageously the thermoplastic material is used as that forming the base part 2, for example, polypropylene or polyethylene. To form a medium-tight but easily tearable upper closure, the above mentioned closure foil is welded or glued onto an associated front lip 24 at the upper edge of the base part 2.

For the manufacturing of the base part, in the example presented here, initially the metal sleeve 10 is produced by extrusion of aluminum. This sleeve is inserted into an injection molding tool, whereupon the cup-like shaped base part 2 is formed by injection molding with a thermoplastic such as polypropylene or polyethylene, whereby the lower part of the sleeve is overmolded. In this manner is formed the portion 14 of the base part 2 that protrudes into the chamber and forms with the lateral surface of the sleeve a surrounding medium-tight closure 16.

The dimensions of the container can be varied over a wide range according to the intended use. Some dimensions of a container for a liquid meal portion to be heated will henceforth be described merely as an example:

| | |
|---|---|
| total height | ca. 100 mm |
| diameter of the base face | ca. 55 mm |
| diameter of the cover part | ca. 80 mm |
| wall thickness of the cover part | ca. 0.8 mm |
| diameter of the metal sleeve | ca. 12.5 mm |
| length of the metal sleeve | ca. 70 mm |
| wall thickness of the metal sleeve | ca. 0.3 mm |
| wall thickness of the heat conducting plates | ca. 0.3 mm |
| height of the T-shaped pin | ca. 5 mm |
| diameter of the pin base | ca. 4 mm |
| diameter of the pin cover | ca. 6 mm |

Figure 5:
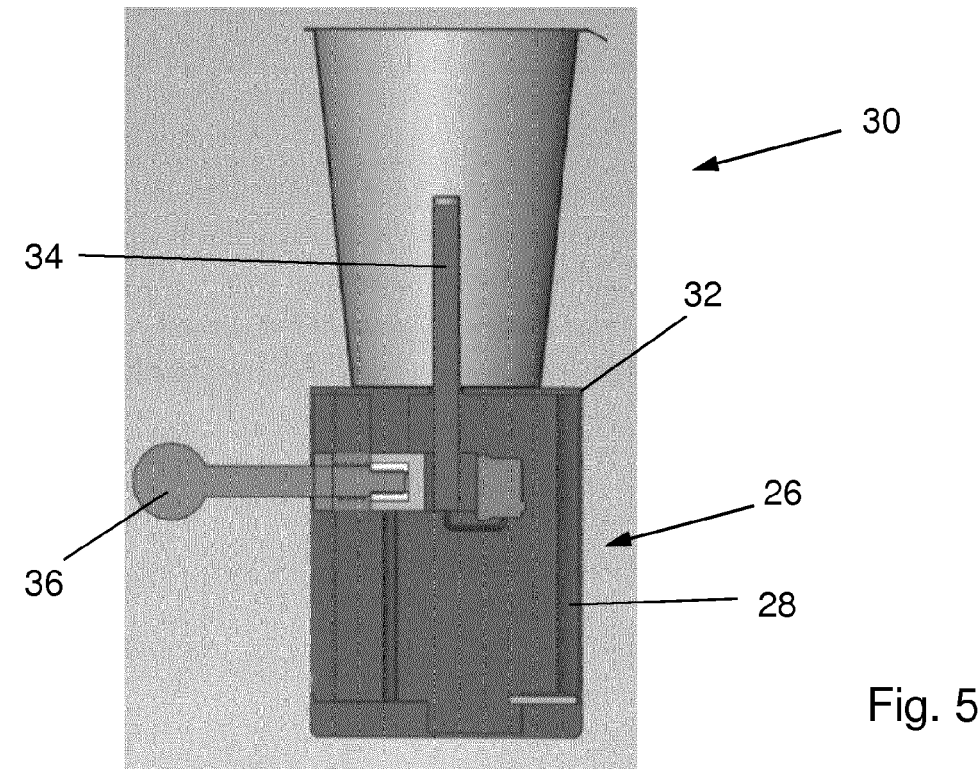
FIG. 5 the beverage container and the heating station of FIG. 4, with extended heating element, again in a longitudinal section.
Figure 8:
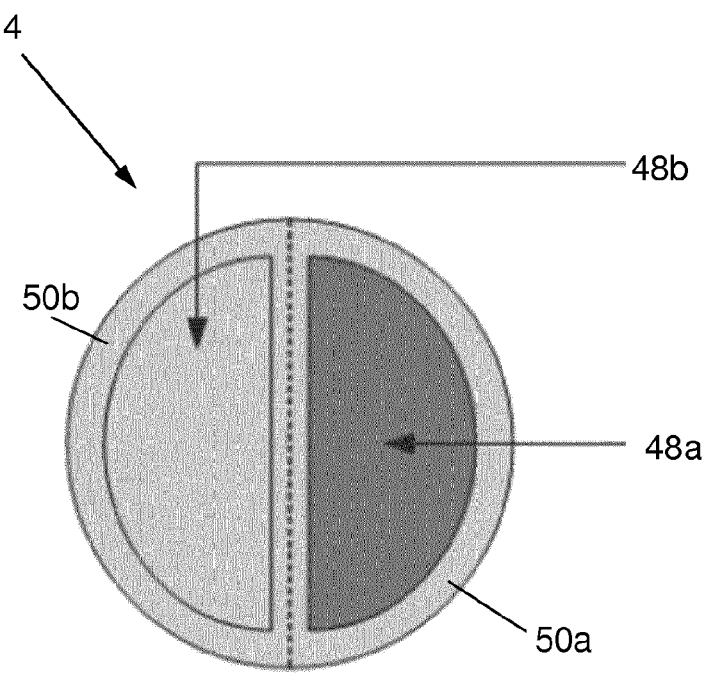
FIG. 8 a further embodiment of a beverage container, in a top view.
Figure 9:
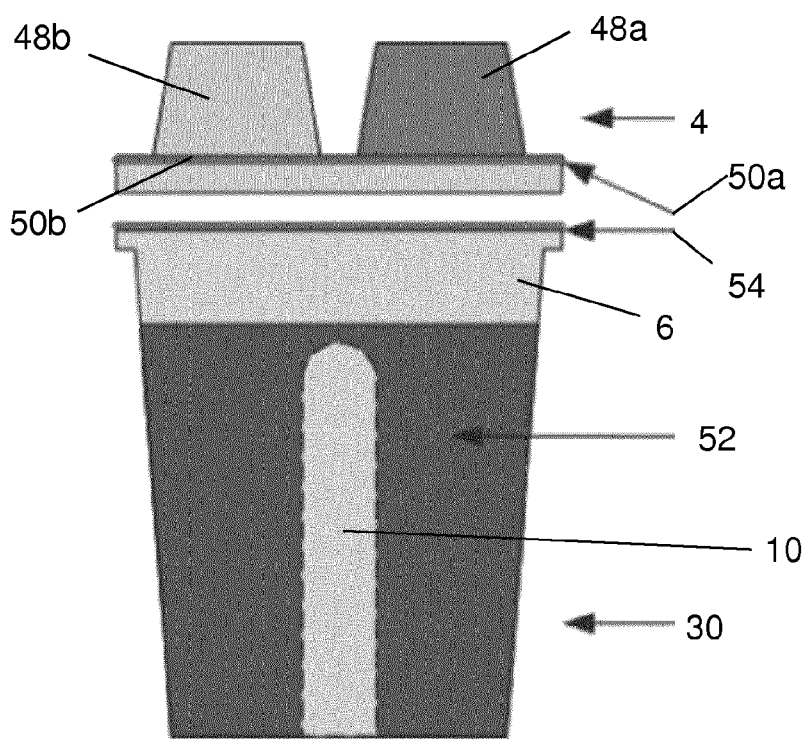
FIG. 9 the beverage container of FIG. 8, in a longitudinal section.

FIGS. 4 and 5 show a first embodiment of a heating station 26. This heating station comprises a base part 28 and a supporting face 32 configured for supporting the base part of a container 30 resting on the heating station, and a cylinder-shaped heating element 34 that is extendable from the supporting face. In the example shown, the heating element can be slidingly moved from a lower, retracted position (FIG. 4) to an upper, extended position (FIG. 5) and vice versa by means of a knob-like operating element 36. Advantageously, the heating element 34 is biased into the lower, retracted position by means of a spring not shown here. In order to keep the heating element in the upper, extended position, the operating element 36 can be snapped into a locking recess of the base part provided therefor.

The external dimensions of the heating element 34, i.e. the external diameter thereof and the length thereof in the extended state projecting over the supporting face 32 correspond within a construction-related tolerance to the internal dimensions of the metal sleeve 10. This allows a best possible heat transfer from the heating element to the metal sleeve. It will be understood that in principle the projecting length of the heating element 34 could also be somewhat shorter than the corresponding length of the metal sleeve, but this would result in an undesirable reduction of the heat transfer.

The heating station 26 further comprises a power supply not shown here which has corresponding heating controlling means and is intended for effecting a controlled heating of the metal sleeve 10 in an extended state of the heating element 34. Advantageously, the power supply is supplied with a 12 V current source (for use in the car and if necessary in the plane) or with a 110 V or 220 V current source (for use in the office, at home, in the train). Advantageously, the heating controlling means are programmed in such manner that the time period and if necessary the heating power are optimized or selected according to the meal portion to be heated. With an electric heating power of 120 W a beverage portion of about 180 g may be heated starting from about 18° C. to 45° C. within about 2 Min 20 Sec.

FIGS. 6 and 7 show a further heating station 26a in which the rod-like heating element 34a is rigidly arranged against the base part 28a and wherein the supporting face 32a is bidirectionally slidable in an axial direction of the heating station from an upper position (FIG. 6) to a lower position (FIG. 7). The upper position of the supporting face defines the retracted state of the heating element, while the lower position of the supporting face defines the extended state of the heating element. In the example shown the supporting face 32a forms the upper closure of a three-part telescope-like sleeve 38. This sleeve comprises spring means 40 for biasing the supporting face 32a into the upper position, wherein the latter corresponds to the basic position of the device without attached container. As can be seen from FIG. 6, the supporting face 32a is provided with two recesses 42 which form a passage for the T-shaped pins 20 of the container 30 projecting downward.

To initiate a heating process the container 30 is placed onto the supporting face 32a whereby the circular segment-shaped wall portions 22 projecting downward serve as an alignment aid. Thereafter, the container is pressed down in such manner that the telescope-like sleeve is slid together and shortened. Thereby, the T-shaped pins 20 of the container 30 get into the associated receiving openings 44 which are arranged at the upper side of the lowest sleeve parts 46 tightly connected to the base part 28a. By a rotational movement around the longitudinal axis of the arrangement the pins 20 get into a tapered retaining region of the receiving openings 44. In this manner the supporting face 32a is locked in its lower position with extended rod-like heating element. 34.

Advantageously the attainment of the above described locked position is used to initiate a heating process. Accordingly, the pins 20 of the container 30 simultaneously act also as identification means for the presence of the container, and the receiving openings 44 provided with corresponding sensor means act as releasing means for initiation of the heating process.

In an embodiment that is particularly suitable for the preparation of liquid meal portions the cover part 4 contains two medium-tightly closed compartments 48a and 48b, each intended for separate storage of one component of the hot meal. For example, these may be a soup powder and croutons, respectively, for an instant soup. At the side of the compartment facing the chamber 6, foil segments 50a and 50b, respectively, form a lower closure segment that is removable for admitting the stored component into the chamber.

In this embodiment the chamber of the container 30 will usually be filled with water 52 already by the manufacturer, when loading the container. Advantageously, also the container is provided with an upper closure foil 54 which can also be removed from the outside and which forms an additional protection against an undesirable anticipated mixing of water and meal components.

In principle, the cover parts comprising the loaded compartments and the water-loaded containers provided with an upper closure foil may be stored and/or sold separately from each other.

FIGS. 10 to 19 show the construction and the operating principle of a further container that is particularly suitable for solid meal portions. For reasons of consistency and by analogy to the other embodiments, the part which is provided with the metal sleeve acting as the primary heat transfer element will always be referred to as "base part" even if it might rather appear to be a cover part. Correspondingly, the counter-part without metal sleeve will always be referred to as "cover part" even if it might rather appear to be a base part or perhaps a main container.

Figure 10:
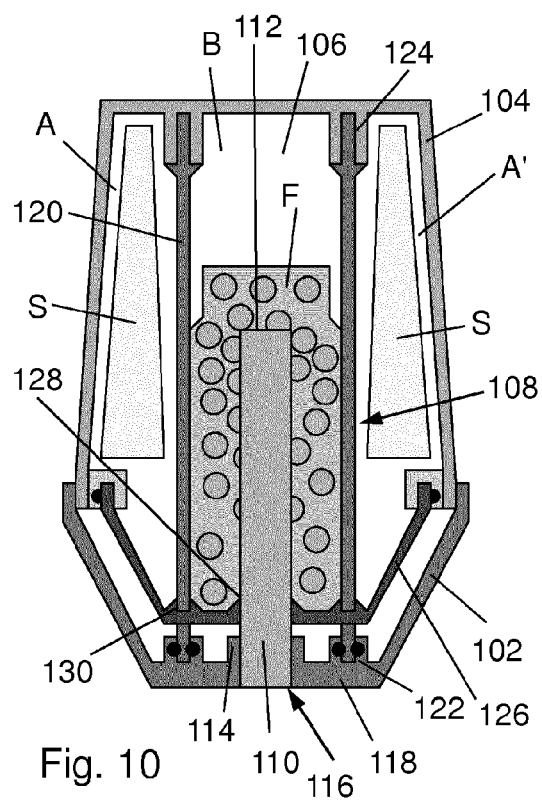
FIG. 10 a further embodiment of a container, particularly for solid meal portions, in a schematic view, in a longitudinal section.

The container shown in FIG. 10 comprises a base part 102 and a cover part 104 disposed thereon, wherein said parts together form a medium-tight chamber 106 for a solid meal portion to be heated. The base part made of a thermoplastic resin comprises a primary heat transfer element 108 protruding into the chamber. The heat transfer element comprises a metal sleeve 110 extending into the base part which is connected to the base part in a medium-tight manner and which is provided with an upper closure cap 112. The metal sleeve 110 is surrounded in the lower region thereof by a portion 114 of the base part 102 protruding into the chamber, whereby a surrounding medium-tight closure 116 is formed between these parts. In the example shown, the upper closure cap 112 and the metal sleeve 110 are integrally formed from aluminum. Because the container is intended for mounting onto an associated heating station, the base part is provided with a substantially planar base face 118.

The cover part 104 is formed by a cup-like shaped element which is inserted into the upper rim of the base part 102 to form a medium-tight but easily separable upper closure. Advantageously, this closure is configured in a generally known manner as a snap connection which is covered at the outer side thereof with a wax layer and/or a sealing strip. The latter also acts as a tamper evident protection against unauthorized reloading of the container.

Moreover, the container of FIG. 10 comprises a secondary heat transfer element extending substantially parallel to the metal sleeve 110 and spaced apart therefrom, which heat transfer element is configured in form of two heat conducting plates 120 made of aluminum which are arranged substantially parallel to each other and which are thermally connected with the metal sleeve in a region near the base by means of a tertiary heat transfer element not shown here. Preferably, the tertiary heat transfer element is formed from an aluminum sheet and encloses a region near the base of the metal sleeve 110.

The two heat conducting plates 120 divide the chamber of the container into three sub-chambers A, B and A' that are separated from each other. As indicated schematically in FIG. 10 the two external sub-chambers A and A' each contain a slice of bread S, while the internal sub-chamber B contains a sandwich filling F.

To form a medium-tight or substantially medium-tight separation of the said sub-chambers, edge zones of the heat conducting plates are received in corresponding grooves 122 and 124 of the base part and cover part, respectively. In this manner a mechanical stabilization of the filled container is achieved at the same time. Advantageously, these grooves are initially filled with a food compatible wax material which is slightly warmed and thus becomes more flowable when the heat conducting plates are inserted. This allows using relatively thin heat conducting plates, for example with a wall thickness of 0.3 mm without having an undesirable deformation during the insertion process.

As will be henceforth described in more detail, the container further comprises a scraper part 126 arranged between the base part and the cover part, which scraper part is provided with a through hole 128 for the metal sleeve and with through slots 130 for the heat conducting plates.

The mounting and the loading of the container will henceforth be explained by reference to FIGS. 11 to 15.

Figure 11:
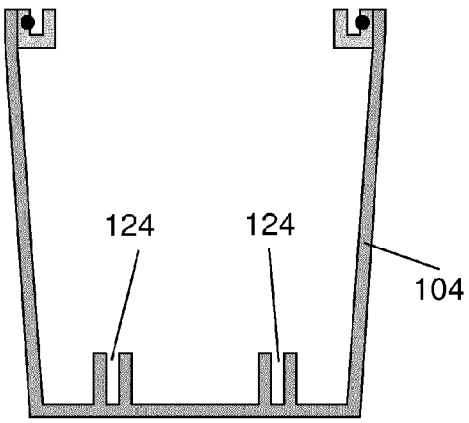
FIGS. 11-18 the process of loading, heating and removing of the content of the meal portions container of FIG. 10, in a schematic view, in a longitudinal section.

According to FIG. 11, the cover part 104 is initially provided head up, i.e. with the opening directing upward.

Figure 12:
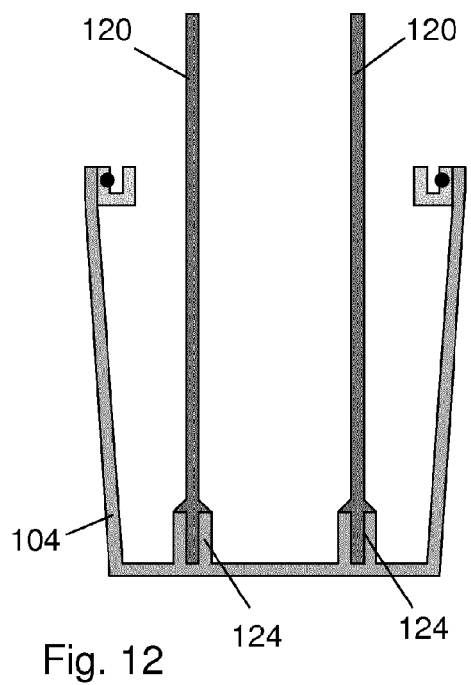

Thereafter, according to FIG. 12 the two heat conducting plates 120 are inserted into the grooves 124 of the cover part. For this purpose the components are designed in such manner that a plug-in connection with a second releasing force F2 is formed.

Figure 13:
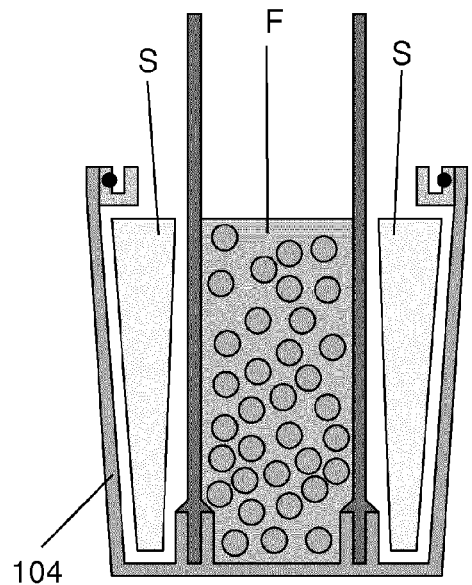

Subsequently, according to FIG. 13, a loading process of the cover part is carried out.

Figure 14:
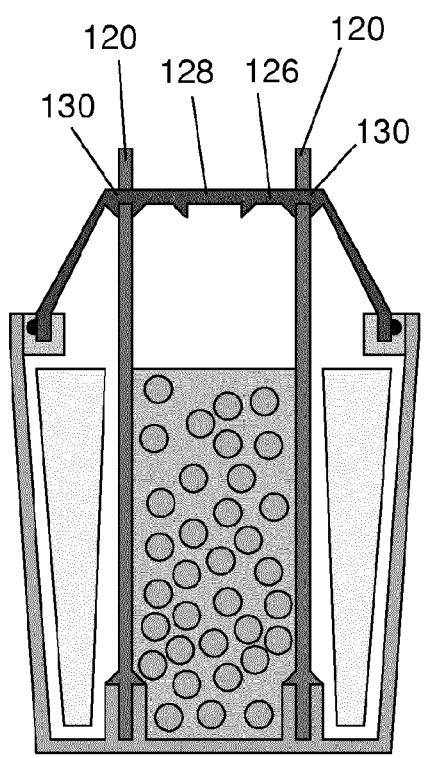

Subsequently, according to FIG. 14, the scraper part 126 is attached onto the cover part, whereby the through slots 130 of the scraper part 126 receive the upper edges of the two heat conducting plates 120.

Figure 15:
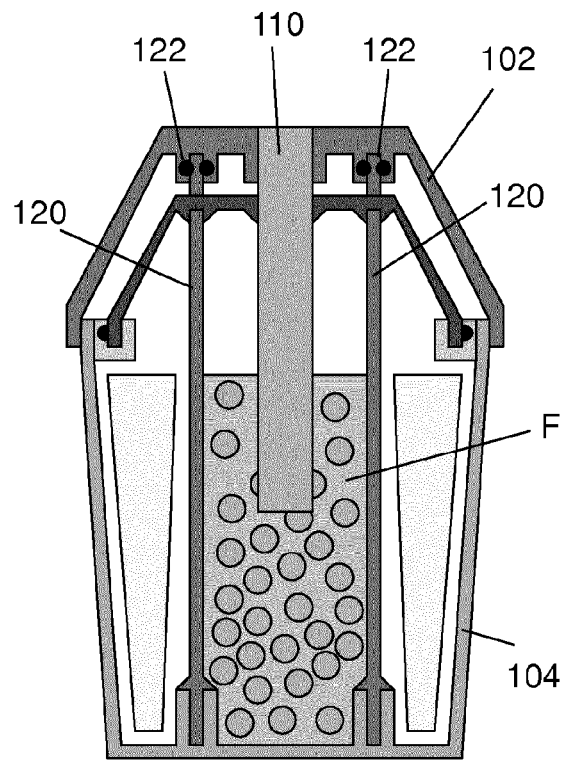

Finally, according to FIG. 15 the base part 102 is plugged onto the equipped cover part 104. In this step the metal sleeve 110 penetrates into the sandwich filling F. At the same time a plug-in connection with a first releasing force F1 is formed between the grooves 122 of the base part and the heat conducting plates 120. Moreover, a releasable medium-tight connection is formed between the edge zones of the cover part 104 and of the base part 102. The arrangement thus obtained is rotated, at the latest prior to the heating process, in such manner that the base part 102 comes to lie downwards. Thus, the situation shown in FIG. 10 is reached. Herewith a heating process as described above can now be carried out.

Figure 16:
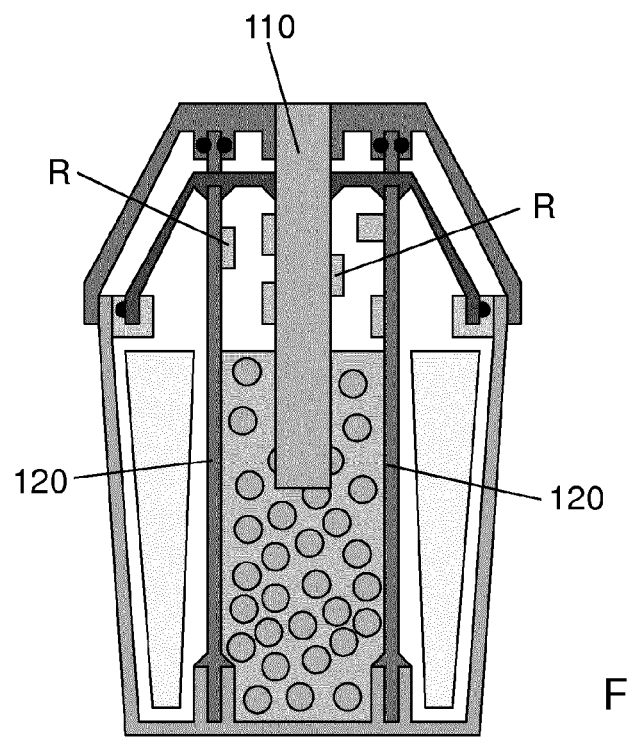

The removal of the container content after completion of the heating process will henceforth be explained by reference to FIGS. 16 to 18. To this end it is essential that the first releasing force F1 is larger than the second releasing force F2.

Initially, a rotation is carried out in such manner that the cover part again comes to lie downwards. This leads to the situation shown in FIG. 16, which substantially corresponds to that shown in FIG. 15 with the difference that the meal portion located in the container has meanwhile been heated up. Moreover, in some cases there will be some residues R of the meal portion sticking onto the metal sleeve 110 and/or the heat conducting plates 120.

Figure 17:
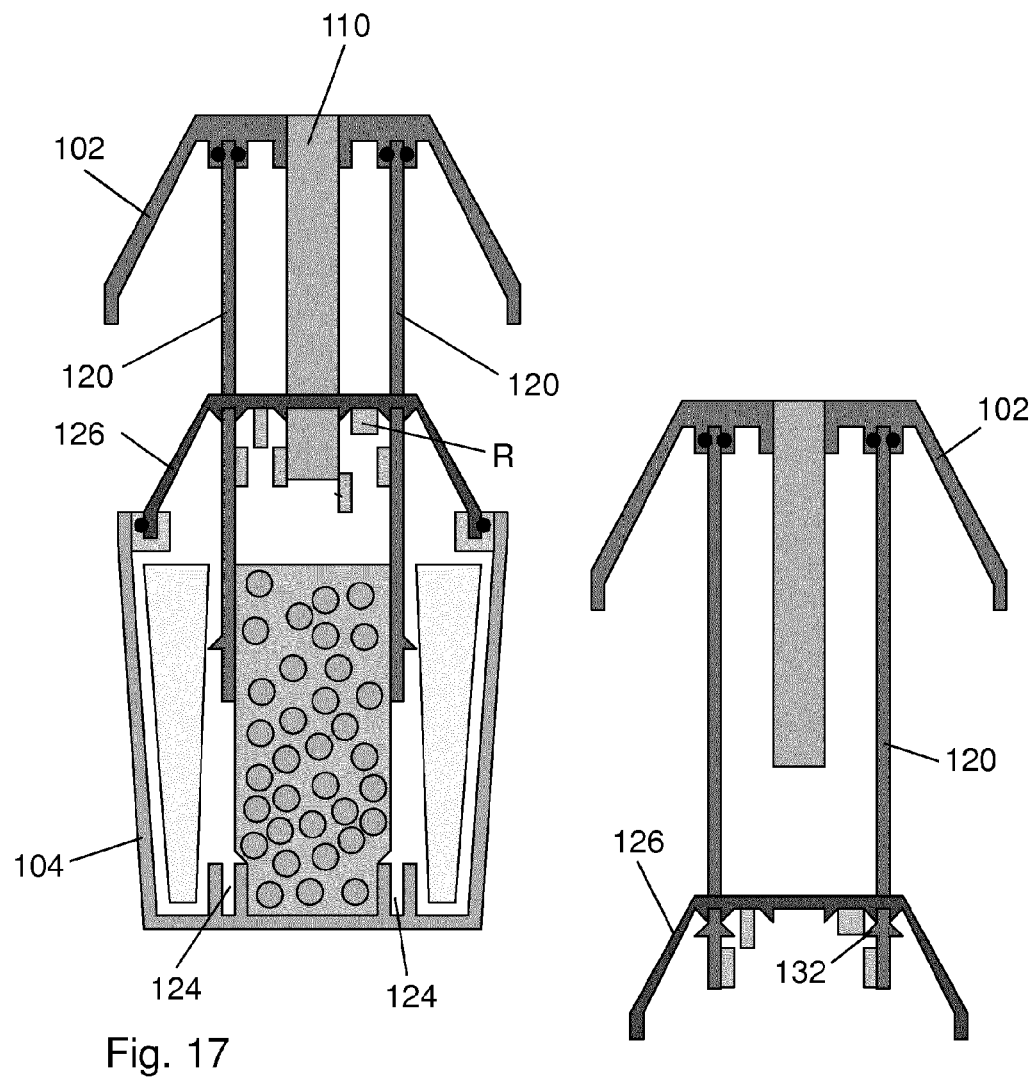

Thereafter, according to FIG. 17, the base part 102 along with the metal sleeve 110 is drawn upwards with respect to the cover part 104, whereby the medium-tight connection between the base part and the cover part is opened up. Hereby, due to the larger releasing force F1, the two heat conducting plates 120 remain at the base part 102 and are disengaged from the grooves 124 of the cover part 104. In this process, the residues R sticking on the metal sleeve 110 and/or the heat conducting plates 120 are retained by the scraper part 126.

Figure 18:
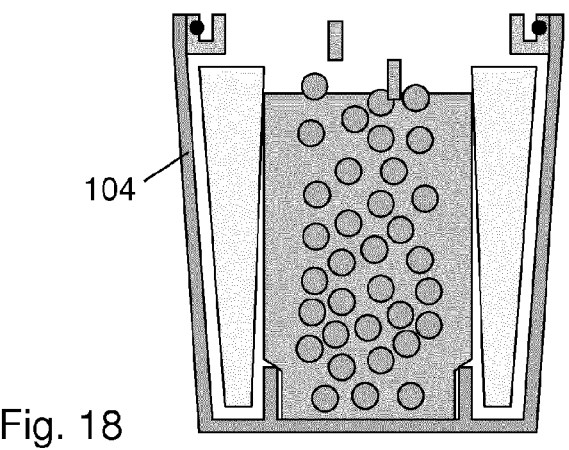

As particularly shown in FIG. 18 the heat conducting plates 120 are provided with protrusions 132 that form a stop against the side of the scraper part 126. Between the scraper part 126 and the cover part 104 there is a plug-in connection with a third releasing force F3 that is smaller than the first releasing force F1. As a result, upon separating the base part 102 from the cover part 104, the heat conducting plates 120 remain attached to the base part 102 and due to the said protrusions 132 they are able to disengage the scraper part 126 from the cover part 104, i.e. the scraper part is taken along with the heat conducting plates of the base part.

Figure 19:
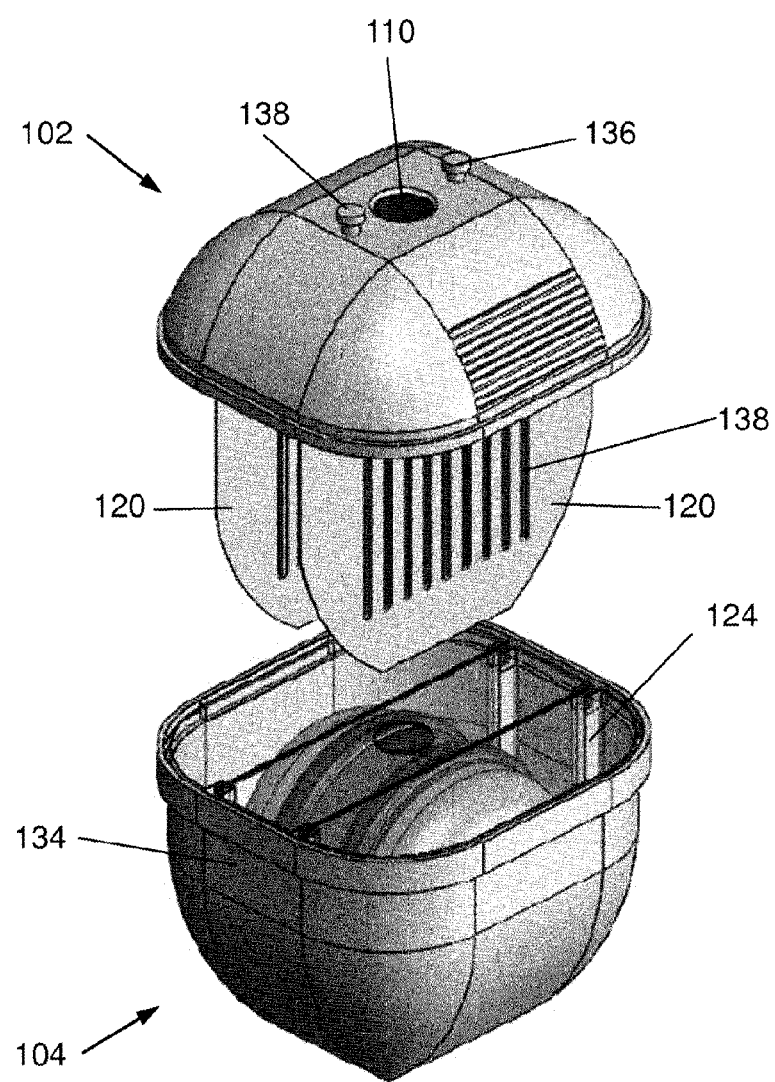
FIG. 19 a meal portions container according to the principle of FIG. 10, in a perspective view, with a hamburger contained therein.

As particularly shown in FIG. 19 the grooves 124 arranged at the cover part 104 are not only formed in the front region of the cover part, but also in the region of the lateral surface 134. The same applies for the base part 102. Moreover, FIG. 19 shows that analogous to the case of the previously described beverage container, T-shaped pins 136 are formed at the base part 102 and act as identification means and/or as attaching means. Finally, FIG. 19 shows that the heat conducting plates 120 are advantageously provided with a plurality of longitudinal ribs 138 which act as mechanical stabilization of the heat conducting plates.

The invention claimed is:

1. A container for rapid hot-food catering comprising a base part and a cover part disposed thereon, wherein the said parts together form a chamber for a meal portion to be heated, and wherein at least the base part is made of a thermoplastic resin, characterized in that the base part comprises a primary heat transfer element protruding into the chamber and comprising a metal sleeve which extends into the base part and which is provided with an upper closure cap, the metal sleeve being connected to the base part, and wherein the cover part contains at least one closed compartment for separate storage of one component of the hot meal, wherein a segment of the compartment facing the chamber can be removed from the outs de in order to bring the stored component into the chamber.

2. The container according to claim 1, wherein the primary heat transfer element is integrally formed from aluminum.

3. The container according to claim 2, further comprising a secondary heat transfer element extending substantially parallel to the metal sleeve and spaced apart therefrom, which secondary heat transfer element is thermally connected with the metal sleeve at least in a region near the base by means of a tertiary heat transfer element.

4. A container for rapid hot-food catering comprising a base part and a cover part disposed thereon, wherein the said parts together form a chamber for a meal portion to be heated, and wherein at least the base part is made of a thermoplastic resin, characterized in that the base part comprises a primary heat transfer element protruding into the chamber and comprising a metal sleeve which extends into the base part and which is provided with an upper closure cap, the metal sleeve being connected to the base part, and further comprising a secondary heat transfer element extending substantially parallel to the metal sleeve and spaced apart therefrom, which secondary heat transfer element is thermally connected with the metal sleeve at least in a region near the base by means of a tertiary heat transfer element.

5. The container according to claim 4, wherein the secondary heat transfer element ent comprises two heat conducting plates preferably formed from a metal sheet that are arranged substantially parallel to each other.

6. The container according to claim 5, wherein the said heat conducting plates divide the chamber of the container into three sub-chambers that are separated from each other.

7. The container according to claim 6, wherein edge zones of the heat conducting plates are received in corresponding grooves of the base and cover part.

8. The container according to claim 7, further comprising a scraper part arranged between the base part and the cover part, which scraper part is provided with a through hole for the metal sleeve and with through slots for the heat conducting plates.

9. The container according to claim 8, wherein there is a first plug-in connection having a first releasing force between the heat conducting plates and the base part, the first releasing force being larger than a second releasing force prevailing between the heat conducting plates and the cover part.

10. The container according to claim 9, wherein the heat conducting plates are provided with protrusions that form a stop against the side of the scraper part facing the cover part, and wherein there is a further plug-in connection with a third releasing force between the scraper part and the cover part, third releasing force being smaller than the first releasing force.

11. A container for rapid hot-food catering comprising a base part and a cover part disposed thereon, wherein the said parts together form a chamber for a meal portion to be heated, and wherein at least the base part is made of a thermoplastic resin, characterized in that the base part comprises a primary heat transfer element protruding into the chamber and comprising a metal sleeve which extends into the base part and which is provided with an upper closure cap, the metal sleeve being connected to the base part, and wherein the base part is provided at an outer side thereof with:
    i) at least one identification means for a corresponding releasing means of an associated heating station; and/or
    ii) at least one attaching means for attaching to a corresponding coupling means of an associated heating station.

12. The container according to claim 11, wherein the identification means and/or the attaching means are formed as a locking projection for insertion into a correspondingly formed locking recess acting as a releasing means and/or as coupling means, or vice versa.

13. The container according to claim 11 and further comprising a heating station including a base part and a supporting face configured for supporting the base part of the container, and with a rod-like heating element extendable from the supporting face and having external dimensions corresponding to internal dimensions of the metal sleeve of the container, wherein the heating station further comprises heating controlling means for effecting a controlled heating of the metal sleeve in an extended state of the heating element; and, wherein the heating controlling means cooperate with a releasing means which exclusively unlocks a heating process only when an associated identification means of a container is present.

14. A container for rapid hot-food catering comprising a base part and a cover part disposed thereon, wherein the said parts together form a chamber for a meal portion to be heated, and wherein at least the base part is made of a thermoplastic resin, characterized in that the base part comprises a primary heat transfer element protruding into the chamber and comprising a metal sleeve which extends into the base part and which is provided with an upper closure cap, the metal sleeve being connected to the base part;
    a heating station comprising a base part and a supporting face configured for supporting the base part of the container, and with a rod-like heating element extendable from the supporting face and having external dimensions corresponding to internal dimensions of the metal sleeve of the container, wherein the heating station further comprises heating controlling means for effecting a controlled heating of the metal sleeve in an extended state of the heating element; and,
    wherein the rod-like heating element is rigidly arranged against the base part and wherein the supporting face is slidable in an axial direction of the heating station from an upper position to a lower position, the upper position of the supporting face defining the retracted state of the heating element and the lower position of the supporting face defining the extended state of the heating element, wherein spring means are provided in order to bias the supporting face into the upper position, and wherein retaining means are provided in order to retain the supporting face in the lower position.

15. The heating station according to claim 14 for a container according to claim 11, wherein the heating controlling means cooperate with a releasing means which exclusively unlocks a heating process only when an associated identification means of a container is present.

* * * * *